(12) United States Patent
Weyrich et al.

(10) Patent No.: US 10,259,419 B2
(45) Date of Patent: Apr. 16, 2019

(54) GAS BAG ARRANGEMENT AND METHOD FOR MANUFACTURING A GAS BAG ARRANGEMENT

(71) Applicant: TAKATA AG, Aschaffenburg (DE)

(72) Inventors: Christian Weyrich, Elchingen (DE); Mirko Korth, Ulm (DE)

(73) Assignee: Joyson Safety Systems Germany GmbH, Aschaffenburg (DE)

( * ) Notice: Subject to any disclaimer, the term of this patent is extended or adjusted under 35 U.S.C. 154(b) by 0 days.

(21) Appl. No.: 15/110,345

(22) PCT Filed: Jan. 6, 2015

(86) PCT No.: PCT/EP2015/050092
§ 371 (c)(1),
(2) Date: Jul. 7, 2016

(87) PCT Pub. No.: WO2015/104258
PCT Pub. Date: Jul. 16, 2015

(65) Prior Publication Data
US 2016/0332594 A1    Nov. 17, 2016

(30) Foreign Application Priority Data
Jan. 9, 2014  (DE) .......... 10 2014 200 252

(51) Int. Cl.
*B60R 21/217*    (2011.01)
*B60R 21/261*    (2011.01)
(Continued)

(52) U.S. Cl.
CPC ............ *B60R 21/217* (2013.01); *B29C 65/52* (2013.01); *B29C 66/5221* (2013.01);
(Continued)

(58) Field of Classification Search
CPC .................................................. B60R 21/217
See application file for complete search history.

(56) References Cited

U.S. PATENT DOCUMENTS 4,266,692 A     5/1981  Clark
6,142,520 A  *  11/2000  Iino ........................ B29C 65/04
                                            280/728.1
(Continued)

FOREIGN PATENT DOCUMENTS

DE    198 48 794 A1       5/1999
DE    29916177 U1  *  2/2000  ........... B60R 21/217
(Continued)

OTHER PUBLICATIONS

International Search Report dated Jun. 5, 2015 issued in PCT/EP2015/050092.
(Continued)

*Primary Examiner* — Nicole T Verley
(74) *Attorney, Agent, or Firm* — Gordon Rees Scully Mansukhani, LLP (57) ABSTRACT

A gas bag arrangement with a gas bag and a filling mechanism arranged in an opening of the gas bag for filling the gas bag with gas is provided. It is provided that the filling mechanism is elastically held in the opening by a holding mechanism arranged in the region of the opening, wherein the holding mechanism has elastic properties due to which it exerts holding forces on the filling mechanism.

7 Claims, 10 Drawing Sheets

(51) Int. Cl.
  *B29C 65/52* (2006.01)
  *B29C 65/00* (2006.01)
  *B60R 21/262* (2011.01)
  *B29L 22/02* (2006.01)
  *B60R 21/235* (2006.01)

(52) U.S. Cl.
  CPC .......... *B60R 21/261* (2013.01); *B60R 21/262* (2013.01); *B29L 2022/027* (2013.01); *B60R 2021/2358* (2013.01); *B60R 2021/2612* (2013.01)

(56) References Cited

U.S. PATENT DOCUMENTS

| | | | |
|---|---|---|---|
| 6,728,667 B1 | 4/2004 | Westgate | |
| 6,843,501 B1* | 1/2005 | Koh | B60R 21/205 280/728.2 |
| 7,086,663 B2* | 8/2006 | Honda | B60R 21/207 280/730.2 |
| 7,866,690 B2* | 1/2011 | Itoga | B60R 21/18 280/733 |
| 7,871,105 B2* | 1/2011 | Itoga | B60R 21/18 280/730.1 |
| 8,342,571 B2* | 1/2013 | Baumgartner | B60R 21/231 280/728.2 |
| 8,448,984 B2* | 5/2013 | Azuma | B60R 21/26 280/730.2 |
| 8,556,290 B2* | 10/2013 | Fischer | B60R 21/262 280/728.2 |
| 8,622,423 B1* | 1/2014 | Manire | B60R 21/2171 280/730.2 |
| 9,925,950 B2* | 3/2018 | Moeller | B60R 21/263 |
| 2002/0105174 A1* | 8/2002 | Tanase | B60R 21/232 280/730.2 |
| 2003/0090093 A1* | 5/2003 | Ikeda | B60R 21/232 280/730.2 |
| 2003/0205888 A1 | 11/2003 | Keshavaraj | |
| 2004/0046375 A1 | 3/2004 | Lincoln et al. | |
| 2004/0104563 A1* | 6/2004 | Fischer | B60R 21/232 280/743.1 |
| 2004/0160040 A1* | 8/2004 | Takedomi | B60R 21/217 280/729 |
| 2004/0232664 A1* | 11/2004 | Tokunaga | B60R 21/26 280/730.2 |
| 2004/0245749 A1* | 12/2004 | Goujon | B60R 21/217 280/728.2 |
| 2005/0134022 A1* | 6/2005 | Noguchi | B60R 21/2171 280/728.2 |
| 2007/0069512 A1* | 3/2007 | Siegel | B60R 21/217 280/740 |
| 2007/0108752 A1 | 5/2007 | Eckert et al. | |
| 2007/0284858 A1* | 12/2007 | Nishimura | B60R 21/217 280/729 |
| 2008/0012274 A1 | 1/2008 | Zauritz et al. | |
| 2008/0111357 A1 | 5/2008 | Heninger et al. | |
| 2010/0225098 A1* | 9/2010 | Baumgartner | B60R 21/231 280/736 |
| 2011/0101651 A1* | 5/2011 | Bierwirth | B60R 21/2644 280/728.2 |
| 2011/0148077 A1* | 6/2011 | Enders | B60R 21/205 280/728.2 |
| 2011/0295300 A1 | 12/2011 | Verd et al. | |
| 2012/0098239 A1* | 4/2012 | Weigand | B60R 21/217 280/728.2 |
| 2014/0318881 A1* | 10/2014 | Sugimoto | B60R 21/237 180/274 |
| 2016/0075299 A1* | 3/2016 | Wang | B60R 21/18 280/728.2 |
| 2017/0057451 A1* | 3/2017 | Jinnai | B60R 21/2171 |
| 2017/0136977 A1* | 5/2017 | Ohno | B60R 21/013 |
| 2017/0225788 A1* | 8/2017 | Humbert | B60R 21/18 |

FOREIGN PATENT DOCUMENTS

| | | | |
|---|---|---|---|
| DE | 20 2004 016 975 U1 | 2/2005 | |
| DE | 102 42 023 A1 | 2/2005 | |
| DE | 10 2005 005 964 A1 | 8/2006 | |
| DE | 603 09 153 T2 | 8/2007 | |
| DE | 10 2008 060 392 A1 | 6/2010 | |
| DE | 10 2009 058 702 A1 | 7/2011 | |
| DE | 10 2010 040 119 A1 | 3/2012 | |
| GB | 2400354 A | * 10/2004 | .......... B60R 21/217 |
| JP | 55-500432 | 7/1980 | |
| JP | 10-194068 A | 7/1998 | |
| JP | 2004-243976 A | 9/2004 | |
| JP | 2005-178612 A | 7/2005 | |
| WO | WO 2010/020302 A1 | 2/2010 | |
| WO | WO 2011/073445 A1 | 6/2011 | |
| WO | WO 2012/059522 A1 | 5/2012 | |

OTHER PUBLICATIONS

Japanese Notification of Reasons for Rejection dated Nov. 28, 2018 issued in related Japanese Patent Application.

* cited by examiner

GAS BAG ARRANGEMENT AND METHOD FOR MANUFACTURING A GAS BAG ARRANGEMENT

CROSS-REFERENCE TO A RELATED APPLICATION

This application is a National Phase Patent Application of International Patent Application Number PCT/EP2015/050092, filed on Jan. 6, 2015, which claims priority of German Patent Application Number 10 2014 200 252.4, filed on Jan. 9, 2014.

BACKGROUND

This invention relates to a gas bag arrangement and to a method for manufacturing such gas bag arrangement.

The progressive development in the field of sensor technology allows to predict accident events with high probability already before the same happen. This allows the activation of occupant protection systems already before commencement of the accident event with the objective to provide more protection for the occupant by the earlier start of action. In this connection it is known for example to introduce air into a backrest region of a vehicle seat, in order to position the vehicle occupant in a favorable way, before the activation of the actual standard gas bag is effected.

Due to the confined space conditions in a vehicle seat it partly is necessary to separate the installation site of the gas source from the gas bag. Correspondingly, it is required to pass the gas e.g. through a hose to the gas bag and in doing so avoid that an additional leakage is obtained due to the connection of the gas source. This is even more important as in a pre-crash sensor system the performance of the gas source used frequently is lower than the performance of a gas source which is provided with a standard gas bag with in-crash activation.

Thus, there is a need for solutions to airtightly and permanently connect a hose or another filling means, whose one end is connected with a gas source, with a gas bag with its other end. Ideally, this is effected with simple means and with resistance to manufacturing tolerances.

The problem of the avoidance of leakages when a gas source is connected with a gas bag also arises in other airbags, for example also in airbags of a standard airbag system. There is a demand for technical solutions as to how incorporated hoses, tubes, flange-mounted or inserted gas generators, diffusers or similar components can be connected with a gas bag without leakage. In this connection it is known from US 2005/0134022 A1 to introduce a gas generator into a reception port of a gas bag and firmly connect the same with the reception port by means of a clamp. From DE 10 2010 040 119 A1 it is known to insert a gas generator into a pocket of a gas bag and position it such that outflowing air flows into the gas bag interior via an opening arranged in the region of the pocket.

It furthermore is known to push parts circular in cross-section such as hoses or tubes into an open passage of a filling snout of a gas bag and fix the same at the filling snout by means of clamps such that a tight connection is obtained. One problem consists in that such passages, which usually are provided with silicone tracks, can be provided with manufacturing tolerances which render a loadable gastight connection more difficult. In addition, in the case of small filling hoses small clamps only can apply relatively small forces, so that the connection between gas bag and gas port frequently cannot be designed sufficiently tight and stable against pulling out.

SUMMARY

Correspondingly it is the object underlying the present invention to provide a gas bag arrangement which in a simple way and with resistance to manufacturing tolerances provides for a gastight connection of a filling means with a gas bag. Furthermore, a method for manufacturing such gas bag arrangement will be provided.

This object is solved by a gas bag arrangement with the features as described herein and a method as described herein.

Accordingly, the solution according to the invention is characterized in that a filling means, for example a filling hose, a filling tube or a gas generator, is elastically held in an opening of a gas bag by an elastic holding means which is arranged in the region of this opening in the gas bag. Holding is effected by exerting elastic holding forces on the filling means by the holding means.

The holding means in particular can be formed as adhesive and/or be provided in the form of an elastomer. The solution according to the invention makes use of the fact that an adhesive (e.g. silicone) has elastic properties and due to these elastic properties is suitable to exert holding forces on a filling means. It is provided that the adhesive at least partly surrounds the filling means and exerts holding forces on the filling means in radial direction. Due to the elastic properties of the adhesive the connection in addition is airtight and durable. The force of the enclosing adhesive surfaces on the filling means ensures a relatively high frictional force connection, so that the filling means cannot be pushed out or pulled out of the connection easily either by the internal pressure or by tensile forces acting from outside. The longer the portion of the filling means enclosed by the adhesive, the higher naturally is the connecting force between filling means and adhesive.

The gas bag in particular can define an interior space which can be filled with gas for inflating the gas bag. The opening of the gas bag in which the filling means is arranged can provide a connection of the interior space of the gas bag with an external environment of the gas bag.

In one aspect of the invention the adhesive is provided by at least one adhesive track which is arranged between two or more gas bag layers of the gas bag. Such adhesive track thus connects at least two gas bag layers of the gas bag. The use of such adhesive tracks for connecting two gas bag layers is known per se. The solution according to the invention makes use of the fact that such adhesive track taken as such (when a corresponding opening is formed in the same) or two adjacent adhesive tracks, which between themselves form an introduction channel, are suited to exert elastic forces on an oblong filling means which is pushed through an adhesive track or into an introduction channel formed between two adjacent adhesive tracks.

It naturally is necessary that the diameter of the filling means is dimensioned such that when the same is pushed through an adhesive track or when it is pushed into an introduction channel the holding means or adhesive is widened and urged to the outside, so that it exerts holding forces on the filling means in radial direction.

According to one aspect of the invention the filling means is elastically held in a connecting region of the gas bag by the holding means or adhesive. Such connecting region for example is provided by a snout which in the condition of the gas bag spread out flat is substantially rectangular, wherein the two longitudinal edges of the snout each include an adhesive track, which tracks define an introduction channel between themselves.

As mentioned already, the adhesive for example is silicone. The use of silicone as adhesive is advantageous, as the stretchability of silicone can be very pronounced and for example is about 1000% or even higher, i.e. the silicone material can be stretched up to ten times its expansion, until it tears. In principle, however, it is possible to also use other adhesives with elastic properties.

The elastic holding forces which the holding means or adhesive exerts on the filling means, so that the filling means is held in the opening of the gas bag, can lead to a non-positive attachment of the filling means in the opening. In particular, the attachment of the filling means in the opening of the gas bag can be effected by the elastic holding forces of the holding means, without an adhesive connection being present between the filling means and the gas bag arrangement, in particular the adhesive.

The invention furthermore provides a method for manufacturing a gas bag arrangement. The method comprises the following steps:

providing a gas bag which at least in a partial region includes at least one holding means in the form of an adhesive arranged between two or more gas bag layers, which is provided by a cured adhesive track, pushing an oblong filling means through the at least one adhesive track or into an elastically deformable introduction channel formed by means of the at least one adhesive track, wherein the filling means displaces adhesive of the at least one adhesive track and the adhesive exerts an elastic holding force on the filling means.

Correspondingly, the method according to the invention provides two variants. According to the first variant a filling means is pushed through an adhesive track, wherein such pushing through can be effected in a direction vertical to the adhesive track. The adhesive track taken as such, i.e. without the necessity of the cooperation with a further adhesive track, provides an elastic holding force on the filling means.

According to the second variant of the method according to the invention it is provided, on the other hand, that the elastic holding force is provided by an elastically deformable introduction channel which is formed by at least one adhesive track. Thus, a channel for the filling means is defined with the adhesive. On pushing the filling means into this channel, the adhesive is displaced and thereby exerts an elastic holding force on the filling means.

In both variants of the method according to the invention adhesive of at least one adhesive track is displaced from its starting position by introducing the filling means. Due to the elastic properties of the adhesive, the same tries to return into its starting position and thereby exerts an elastic holding force on the filling means.

As mentioned already, one aspect of the invention provides that the filling means is pushed through an adhesive track. According to a first processing method this can be effected in that the filling means is pushed through a closed and already cured adhesive track present between two or more gas bag layers. The adhesive which thereby is displaced radially to the outside surrounds the enclosed object and airtightly and permanently seals the connection due to its elastic properties. The surrounding force on the enclosed object also ensures a high frictional connection, so that the filling means cannot be pushed or pulled out of the connection either by the internal pressure or by tensile forces acting from outside.

In this processing method pushing of the filling means through the adhesive track thus is effected without an incision or the like first being made in the adhesive track. The same rather centrally tears open when the filling means is pushed through the adhesive track, wherein the adhesive is urged to the outside concentrically.

It can be provided, however, that a spike or the like is arranged on the end face of the filling means, which simplifies pushing of the filling means through the adhesive track. Such spike can be removed again after completely placing the filling means, for example by pulling the spike out via a hollow cylinder of the filling means.

According to a second processing method, the filling means likewise is pushed through an adhesive track, but for this purpose an incision first is made in the adhesive track by means of a tool. Such incision for example is made by a sword-like tool which provides an oblong cut in the adhesive track. After making the incision, the filling means is pushed through the widening cut down into the interior of the gas bag. In this processing method it thus is provided to push a special tool through the adhesive track cured already before leading the filling means through a closed adhesive track, in order to open the same before mounting the filling means. Through this incision, the filling means subsequently is pushed after removing the tool. The circumference of the opening mouth resulting from the insertion of the tool is smaller than the circumference of the filling means to be pushed in. This variant is suitable in particular for leading through filling means with comparatively large diameter, for example diameters larger than 8 mm.

According to a further aspect of the method according to the invention an elastically deformable introduction channel of exactly defined diameter is provided in a connecting region of the gas bag for receiving the filling means. This aspect of the invention thus provides that initially an elastic introduction channel of exactly defined diameter is produced, into which the filling means subsequently can be inserted. The diameter of the provided channel is smaller than the diameter of the filling means, so that when introducing the filling means into the channel adhesive is urged to the outside and exerts an elastic holding force on the filling means.

To provide the introduction channel of exactly defined diameter it is provided to apply at least one adhesive track on a lower gas bag layer in the connecting region. Into this adhesive track or, in case several adhesive tracks are provided, between these adhesive tracks an inlay is inserted in the wet condition of the adhesive, which inlay typically is formed flat. Subsequently, at least one upper gas bag layer of the gas bag is applied. The arrangement then can be pressed to obtain the desired silicone track height. Subsequently, the adhesive cures.

After curing of the adhesive, it is provided according to one variant of the invention that the inserted inlay now is removed. After removing the inlay a defined introduction channel is left, which is formed by adhesive material of the at least one adhesive track and therefore is elastic. The exact provision of this channel also is effected in the case of extremely large tolerances of the adhesive track due to the described manufacturing method in which the inlay is inserted into the still wet adhesive.

Alternatively it can be provided that the inlay remains where it is and is not removed. For this case it is provided that the inlay consists of an elastic material, for example of the same material as the adhesive layer and completely connects with the adhesive layer. In so far, the inlay provides a part of the adhesive layer.

One aspect of the invention provides that in the connecting region at least two adhesive tracks extending parallel to each other are applied on the lower gas bag layer. In the still wet condition of the adhesive the inlay then is inserted between the same, wherein the side faces of the inlay facing the respective adhesive tracks are wetted with the adhesive of the respective adhesive track, so that after curing and removal of the inlay a defined introduction channel is present, independent of possible tolerances of the adhesive track.

Introducing the filling means for example can be effected by means of a pneumatic piston which pushes the filling means into a narrowed adhesive track.

Furthermore it can be provided that for increasing the connecting force and the tightness cable ties, clamps, shrink tubes or the like additionally are used in the region of the filling port. The same produce an additional holding force which acts in addition to the holding force provided by the adhesive according to the invention. In particular with small channel widths such additional connecting means also can be omitted.

The longer and deeper the region is in which the filling means is enclosed by adhesive, the higher is the connecting force between insertion part and gas bag, wherein this relation is approximately linear. The connecting force which is provided by the elastic displacement of the adhesive can be maximized by the fact that the channel is designed so narrow that when pushing in the filling means, the adhesive is loaded up to or also beyond the elongation limit. The minimum channel opening width of the adhesive track thereby adapts automatically to obtain an optimized geometry. The joining direction is parallel to the gas bag main layers glued to each other by the adhesive track.

The filling means can non-positively be held in the opening of the gas bag by the elastic holding forces of the adhesive. In particular, the attachment of the filling means in the opening of the gas bag can be effected by the elastic holding forces of the adhesive, without an adhesive connection being made between the filling means and the gas bag arrangement (in particular the adhesive). The formation of an adhesive connection for example can be prevented in that the filling means is brought in contact with the adhesive only after curing of the same.

BRIEF DESCRIPTION OF THE DRAWINGS

The invention will be explained in detail below by means of several exemplary embodiments with reference to the Figures of the drawing.

DETAILED DESCRIPTION

FIGS. 1A to 1D schematically show the provision of an introduction channel of defined diameter in a filling snout of a gas bag and the arrangement of a filling means in such introduction channel.

Figure 1A:
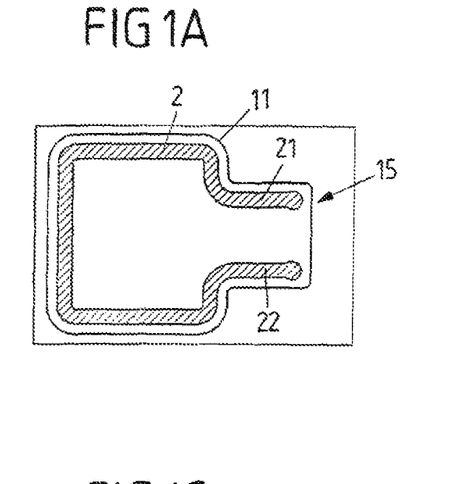
FIGS. 1A-1D show method steps of a first design variant of a method according to the invention for manufacturing a gas bag arrangement.

In a first step as shown in FIG. 1A a silicone track 2 is applied on a gas bag layer 11 spread out flat. The gas bag layer 11 comprises a snout-shaped connecting region 15 which serves the accommodation and arrangement of a filling means. In the connecting region 15 the silicone track 2 forms two substantially parallel arms 21, 22 which in the following also are referred to as parallel silicone tracks. Instead of silicone, the track 2 also can consist of another elastic adhesive. The explanation of the invention with silicone as adhesive in so far is to be understood by way of example only.

Figure 1B:
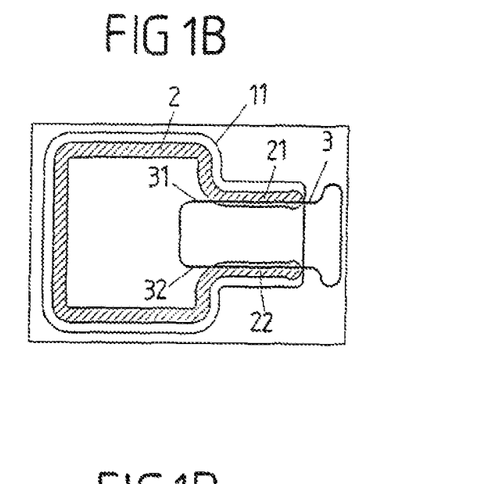

Subsequently, a flat inlay 3 is inserted into the wet silicone, as shown in FIG. 1B. The inlay 3 is formed such that in the regions which extend parallel to the arms 21, 22 of the silicone track 2 its lateral boundary surfaces 31, 32 directly adjoin the silicone track 2 and are wetted by the adjoining silicone, even if the silicone track 2 is placed on the gas bag layer 11 with manufacturing tolerances. The silicone track 2 and the inlay 3 hence are laid out such that the silicone track will reach the edges 31, 32 of the inlay 3 in each tolerance case.

Furthermore, an upper gas bag layer or an upper fabric section is placed on the lower gas bag layer 11. Subsequently, the resulting arrangement is pressed to obtain the desired silicone track height. For a better clarity of the representation, the upper gas bag layer is not shown separately. After curing, the upper gas bag layer and the lower gas bag layer 11 are connected with each other along their edge region by means of the silicone track 2, which extends along the entire circumference of the gas bag 1 now obtained.

Figure 1C:
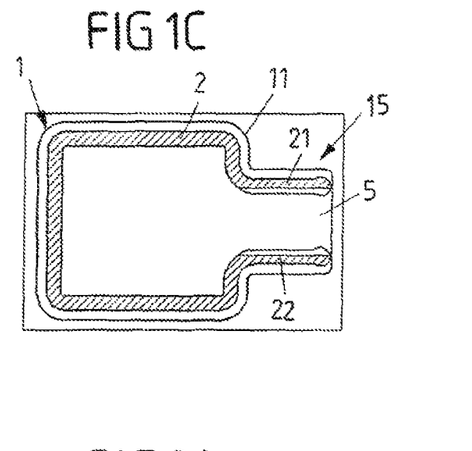

After curing of the silicone, the inlay 3 is removed, cf. FIG. 1C. The resulting introduction channel 5 exactly has the opening width of the inlay 3. The introduction channel 5 provides an opening of the gas bag 1, via which gas for filling the gas bag 1 can be filled into the same.

Figure 1D:
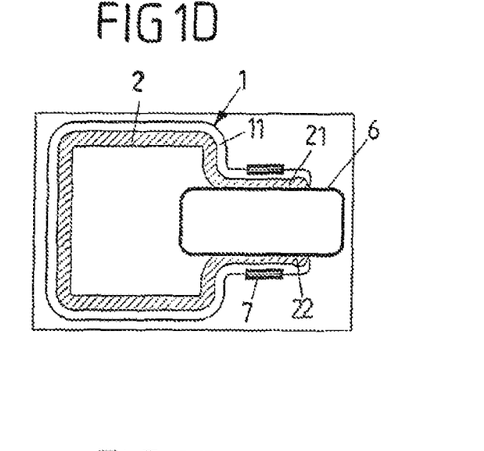

Into the introduction channel 5 fabricated very precisely in this way, which extends between the two silicone tracks 21, 22 and adjoins the same, a filling means 6 now is introduced in a defined way according to FIG. 1D, which serves to fill the gas bag 1 with gas. The filling means 6 for example is a hose, a tube, a gas generator or a valve. The filling means 6 is pushed in through the introduction channel 5 parallel to the fabric layers 11, which introduction channel has a smaller diameter than the filling means 6. The elasticity of the silicone thereby can be utilized to pretension the introduction channel 5 or the silicone arms 21, 22, which define the same, around the introduced filling means 6 and thereby realize a tight fit around the contact surface between filling means and silicone.

At relatively large diameters (larger than 10 mm) it can be provided in addition that to increase the connecting force and tightness, the filling means 6 is secured from outside by means of an additional squeezing means 7. However, such squeezing means 7, for example a hose clamp or a cable tie, no longer has to press shut a gap between silicone track 21, 22 and filling means 6, like in the prior art. Correspondingly, the required tightening force of the squeezing means 7 is reduced by the utilized inherent elasticity of the silicone and the resulting positive fit of the surfaces.

Figure 2A:
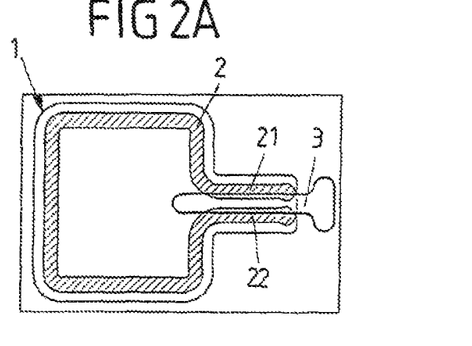
FIGS. 2A, 2B show a modification of the first design variant of the method when using filling means with small diameters.
Figure 2B:
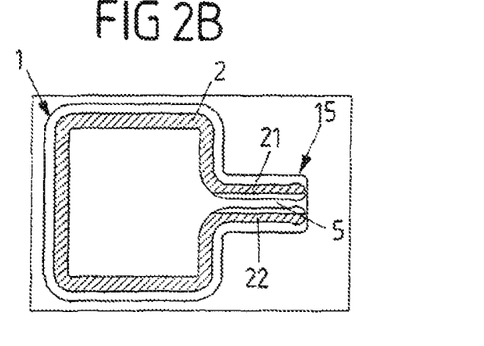

At relatively small diameters of for example less than 10 mm, such squeezing means 7 also can be omitted completely. A corresponding arrangement is shown in FIGS. 2A, 2B, which otherwise correspond to FIGS. 1B and 1C. The holding force of the connection alone via the inherent elasticity of the expanded adhesive is large enough to achieve a sufficient connecting force between the surfaces of silicone and filling means resting against each other.

The mode of operation of the solution according to the invention will further be explained below with reference to FIGS. 3A to 3D. It applies that the tightness and the grip of the connection between the silicone and the gas bag on the one hand and the filling means on the other hand is achieved in that the silicone is displaced from the inside to the outside and thereby charged like a concentric spring.

Figure 3A:
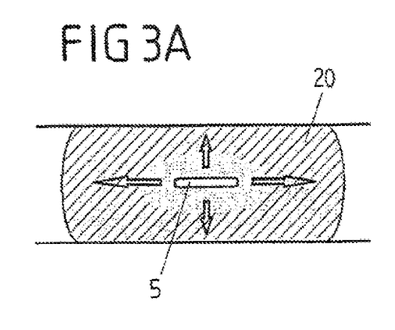
FIGS. 3A-3D show sectional representations through an adhesive and a filling means arranged in the same to explain the physical backgrounds of the first design variant of the method.

FIG. 3A proceeds from a clear gap 5 which the inlay 3 has kept free. When pushing in a filling means 6, such as e.g. a hose or a tube, the silicone 20 is displaced concentrically. The silicone 20 primarily can escape only upwards and downwards.

Figure 3B:
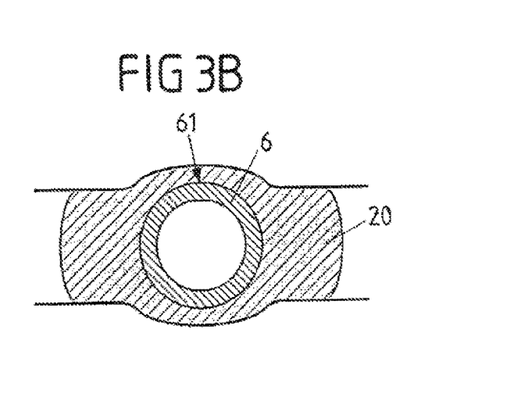

According to FIG. 3B the displaced silicone 20 positively spans around the enclosed surface 61 of the filling means 6 and bulges upwards and downwards to the outside along with the glued gas bag fabric. Due to the form fit and the elasticity of the silicone, which completely clings to the surface 61 of the filling means 6, an absolute tightness between inserted filling means 6 and the silicone 20 is obtained.

Figure 3C:
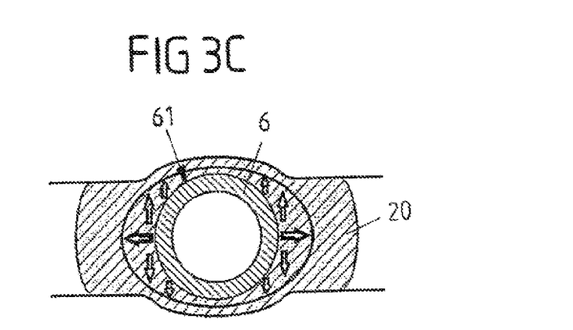

As shown in FIG. 3C, it applies that in the horizontal direction a higher resistance of the relatively broad silicone is present. In the vertical the silicone 20 is relatively thinner, so that the counterforce correspondingly is less strong. The silicone 20 therefore is stretched most at the sides to the left and right.

Figure 3D:
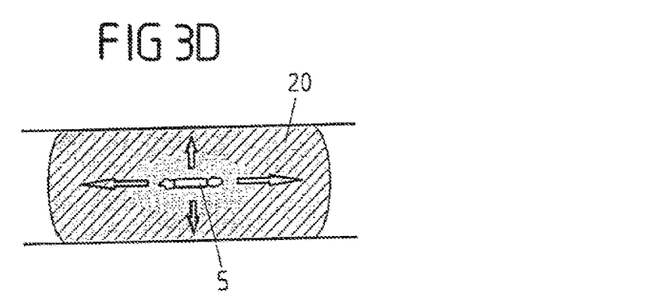

This also explains why, when loaded beyond the elasticity limit, the silicone 20 will tear further in horizontal direction until the elongation limit is reached again, as is shown in FIG. 3D. Depending on the choice of the used adhesive, it can thereby be achieved that the filling means 6 is held at the gas bag 1 with a particularly high holding force (e.g. higher than by an adhesive connection).

The used silicone for example has a stretchability of about 1000%, i.e. the material can be stretched to 10 times its expansion. With this value, the optimum width of an inlay 3 can be dimensioned approximately. It should be noted here that the vertical and the horizontal displacement of the silicone within the opening are differently strong. The thinner the silicone layer is dimensioned in its vertical height, the more the load of the silicone deviates from a uniform distribution. As practicable value an average elongation factor of about 5 can be applied. For this case, the circumferences (U) would be related to each other as follows:

U (inlay)*5=U (filling means), wherein U indicates the circumference and it applies that U (inlay)=2*b and U (filling means)=$\pi \times D$.

b indicates the width of an inlay 3 and D indicates the diameter of the filling means 6. For example, if D is assumed to be 8 mm, the width of the inlay 3 is: b=8 mm*$\pi$/(5*2), so that the width of the inlay is about 2.5 mm. An inlay of this width thus would be sufficiently broad, so that when pushing in a filling means with a diameter D of 8 mm, the clear opening would not tear internally, wherein an approximately maximum tension of the elastic silicone can be utilized. The "push-in depth" through the silicone in turn enters into the connecting force approximately linearly.

Figure 4A:
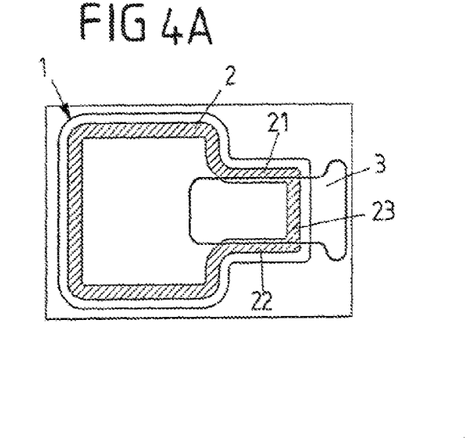
FIGS. 4A, 4B show a second modification of the first design variant of the method according to the invention.
Figure 4B:
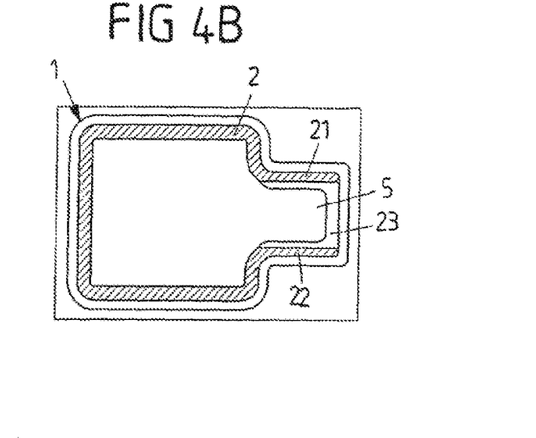

FIGS. 4A, 4B show a modification in which the tightness of the connection is further improved by the fact that a region 23 between the silicone track segments 21, 22 forming the introduction channel 5 also is filled up with silicone, e.g. in the zone on which the outer squeezing means 7 afterwards will be pressed (cf. FIG. 1D). There is obtained a silicone surface without interruption around the filling means pushed in.

Figure 5A:
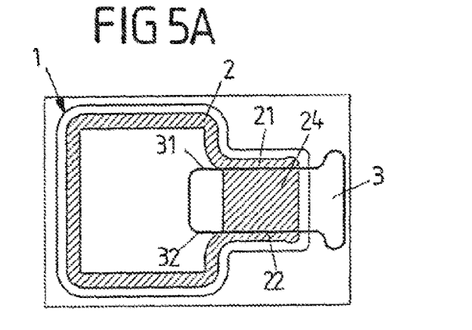
FIGS. 5A, 5B show a third modification of the first design variant of the method according to the invention.
Figure 5B:
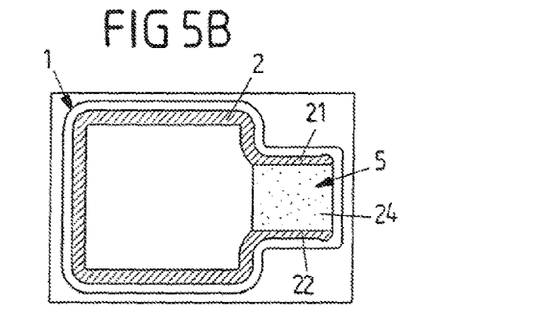

According to FIGS. 5A, 5B the entire surface region 24 between the silicone track segments 21, 22 also can be filled up with silicone according to a further design variant. In other words, the silicone not only extends along the lateral edges 31, 32 of the inlay 3, but also on the upper side and the lower side of the inlay 3, and thus—after removing the inlay of the filling means pushed in—completely surrounds the same. The resulting adhesion surface thereby is increased and the connecting force between filling means and gas bag is increased further.

Figure 6A:
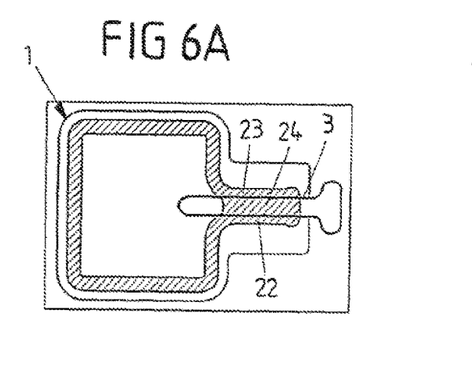
FIGS. 6A, 6B show a fourth modification of the first design variant of the method according to the invention.
Figure 6B:
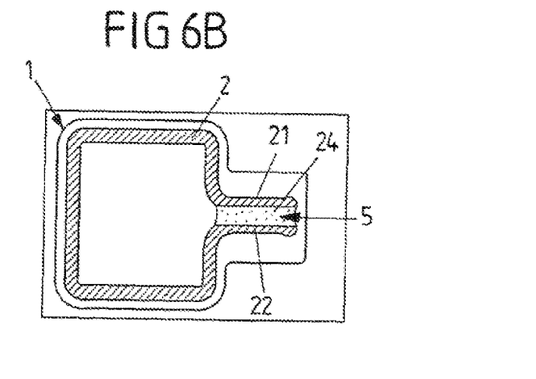

FIGS. 6A, 6B show an exemplary embodiment in which the adhesion force, amplified by the pretension of the silicone, is sufficient to provide for a secure gastight connection also without squeezing means. The geometrical constellation here is decisive. The height of the silicone track (doctor blade height) and the plunge depth (i.e. the length along which the elastic introduction channel 5 extends and rests against the filling means) are the primarily relevant parameters. In principle, the design of FIGS. 6A, 6B corresponds to the design of FIGS. 5A, 5B, wherein however the introduction channel 5 is formed narrower and the inlay 3 correspondingly has a smaller width.

Figure 7A:
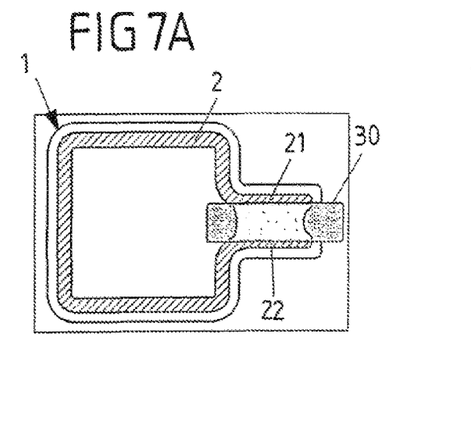
FIGS. 7A, 7B show a fifth modification of the first design variant of the method according to the invention.
Figure 7B:
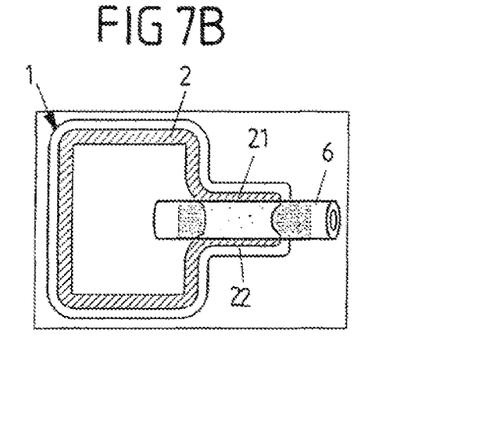

In the case of a relatively long plunge depth into the silicone, difficulties can occur during removal above all with very small, narrow inlays. There is a risk that the inlay is torn off and wholly or partly clogs the introduction channel 5. Therefore, a further aspect of the invention as shown in FIGS. 7A, 7B provides to simply leave the inserted inlay in the silicone surface. For this purpose it can be provided, for example, that a flat hose 30 of the same material (e.g. 2-component silicone) is inserted, which completely connects with the silicone of the silicone seam 2, as shown in FIG. 7A. The desired clear opening of the introduction channel thereby is maintained and on gluing the inlay 30 becomes part of the silicone layers, as shown in FIG. 7B. The filling means 6 then is inserted into the introduction channel formed in this way.

Figure 8A:
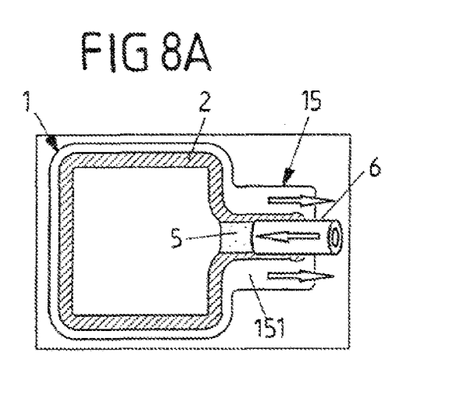
FIGS. 8A, 8B show a sixth modification of the first design variant of the method according to the invention.
Figure 8B:
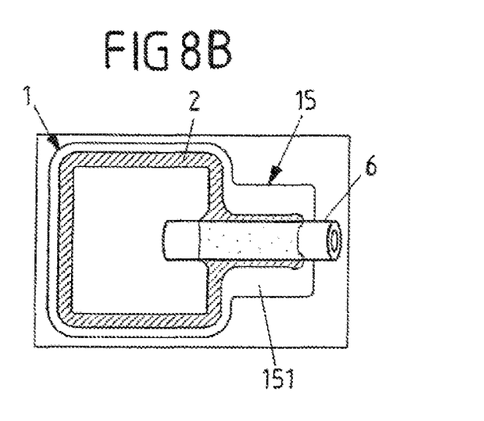

To the extent in which the constriction of the introduction channel 5 with respect to the circumference of the filling means is utilized to increase the connecting forces, the expenditure of force on entry of the filling means 6 into the filling channel 5 is increased. It can therefore be required to correspondingly retain or fix the gas bag 1 and especially the introduction channel 3 during joining. For this purpose, the blank width of the snout-shaped connecting region 15 can be broadened correspondingly in the simplest case, as shown in FIGS. 8A, 8B. The snout-shaped connecting region forms gripping edges 151.

Figure 9A:
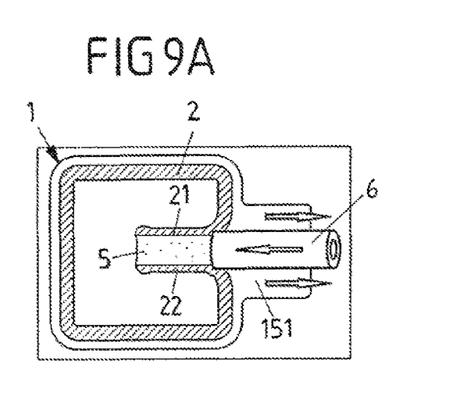
FIGS. 9A, 9B show a seventh modification of the first design variant of the method according to the invention.
Figure 9B:
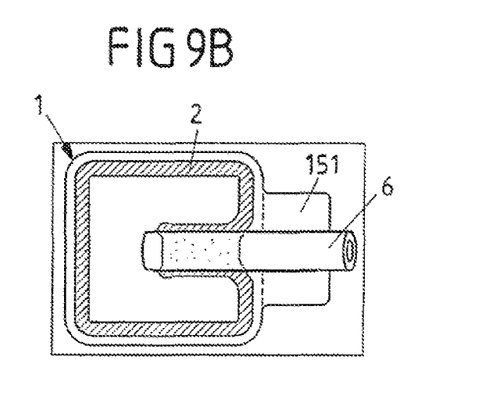

Correspondingly, it can be provided that the snout-shaped connecting region 15 is prolonged beyond the siliconized region, so that the protruding tabs 151 above and below the insertion opening can be utilized for holding up the insertion force, as shown in FIG. 9A. If necessary, the tabs 151 can be cut off after the joining process, as indicated by the broken line in FIG. 9B.

FIGS. 10A to 10D show a schematic representation of a further design variant of the method according to the invention. According to FIG. 10A, a silicone track 2 is provided between at least two gas bag layers of a gas bag 1. Of the at least two gas bag layers of the gas bag 1 merely the lower gas bag layer 11 is shown, just like in FIGS. 1A to 1D. The silicone track 2 forms a closed silicone track, which extends along the circumference of the gas bag 1 and connects its edge regions with each other. The manufacture of the gas bag 1 in so far is effected according to standard.

Figure 10A:
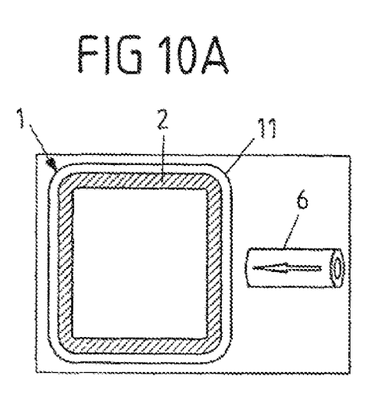
FIGS. 10A-10D show method steps of a second design variant of a method according to the invention for manufacturing a gas bag arrangement.
Figure 10B:
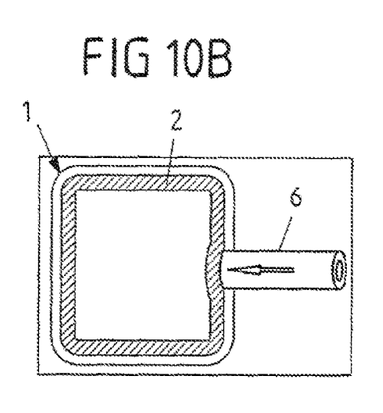
Figure 10C:
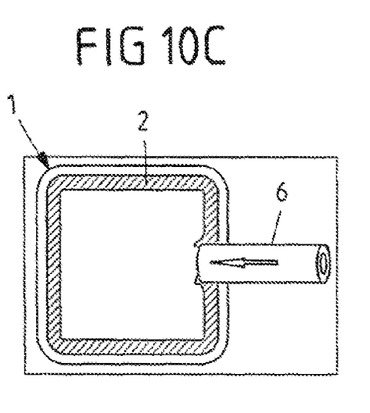
Figure 10D:
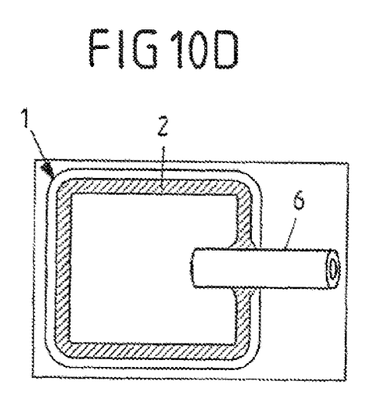

After curing of the silicone a filling means 6, e.g. a filling hose of small diameter, is pushed in through the silicone track 2 substantially vertically thereto down into the inflation region in the interior of the gas bag 1, as shown in FIGS. 10B to 10D. The filling means 6 can be pressed through the closed silicone track 2 by means of a pneumatic piston or the like. Due to the large piercing forces through the closed silicone track 2 it is advantageous when for assembly the gas bag 1 is firmly attached to a worktable.

The elasticity of the silicone provides for encompassing the object pushed in with a clearance and for a tight connection of the surfaces to each other. When the object is pushed in, the silicone is torn up centrally and concentrically displaced to the outside. The same thereby is pretensioned and effects a tight fit around the contact surface, i.e. the outer surface of the filling means 6.

FIGS. 11A to 11D—in a way corresponding to FIGS. 3A to 3D relating to the exemplary embodiment of FIGS. 1A to 1D—explain the physical backgrounds of the connection. In turn it applies that the tightness and the grip of the connection between filling means on the one hand and gas bag or silicone 20 of the silicone track 2 on the other hand is achieved in that the silicone 20 is displaced from the inside to the outside. The stretchability of the silicone for example is about 1000%, i.e. the material can be stretched to ten times its expansion, before it tears.

Figure 11A:
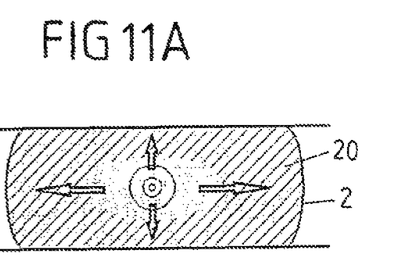
FIGS. 11A-11D show sectional representations through an adhesive and a filling means arranged in the same to explain the physical backgrounds of the second design variant of the method.

Proceeding from a central use of the penetration of the filling means 6, FIG. 11A illustrates a concentric displacement of the silicone 20 of the silicone track 2 by pushing in the filling means 6. The silicone 20 primarily can escape only upwards and downwards.

Figure 11B:
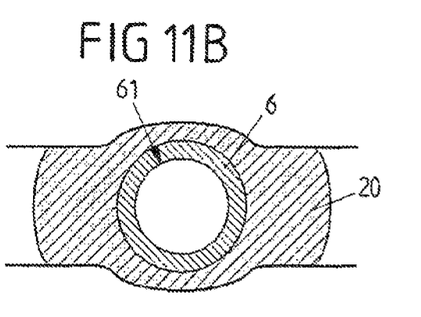

According to FIG. 11B, the displaced silicone 20 positively spans around the surface 61 of the filling means 6 pushed in. Due to the form fit and the elasticity of the silicone 20, which completely clings to the surface, an absolute tightness between the object 6 pushed in and the silicone 20 is obtained.

Figure 11C:
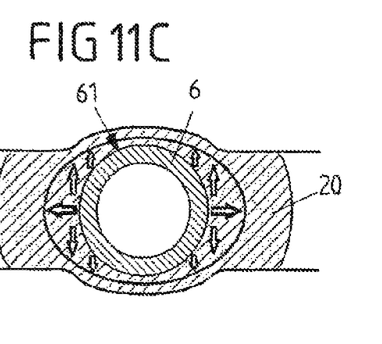

According to FIG. 11C a higher resistance of the relatively broad silicone 20 is present in horizontal direction. In the vertical the silicone is relatively thinner, so that the counterforce correspondingly acts less strongly. The silicone 20 therefore is stretched most at the sides to the left and right.

Figure 11D:
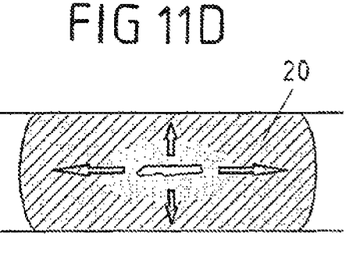

This also explains, as shown in FIG. 11D, why the silicone tears in chiefly horizontal direction on penetration of the filling means or a pricker, when the elongation limit of the silicone elasticity is reached.

Figure 12A:
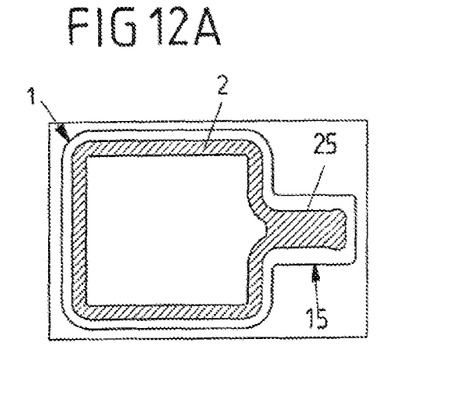
FIGS. 12A, 12B show a first modification of the second design variant of the method according to the invention.
Figure 12B:
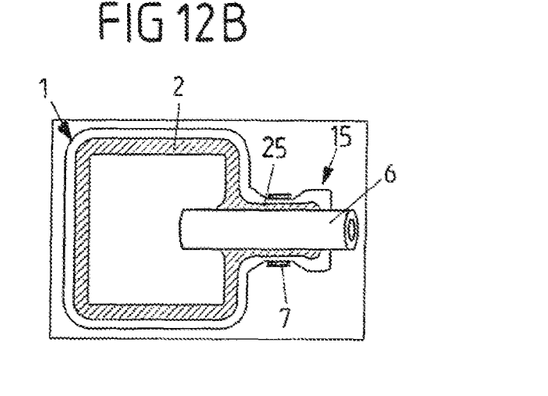

FIGS. 12A, 12B show a modification of the exemplary embodiment of FIGS. 10A to 10D, in which the push-in point into the silicone track 2 is designed like a snout 25, in order to increase the contact surface between the silicone on the one hand and the object pushed in on the other hand and hence the grip of the connection. The snout-like silicone track 25 is formed in a snout-shaped connecting region 15 of the gas bag 1 and is designed such that in each tolerance case they superimpose the parallel track segments. Through the broad silicone track 25 fabricated in this way, a filling hose 6 now can centrally be pushed in in a defined way, as shown in FIG. 12B. The plunge force correspondingly increases with the piercing depth.

At relatively small diameters of a filling means 6, for example in filling hoses and the like with a diameter of less than 8 mm, a squeezing means in turn can be omitted. Due to the inherent elasticity of the expanded silicone 20, the holding force of the connection is large enough to achieve a sufficient adhesion and tightness of the surfaces relative to each other. The height of the silicone track 25 (doctor blade height) and the plunge depth are the relevant parameters for the grip of the connection and can be adapted to the respective application.

After assembly of the filling means 6, however, a clamp 7, a cable tie, a tape or the like can additionally be used to increase the quality and for a better handling, as is shown in FIG. 12B.

The applied squeezing means 7 now no longer must gastightly close the gap which in the prior art is present between silicone track and inserted filling hose. Due to the inherent elasticity of the silicone and the positive fit of the surfaces, the required tightening force of the squeezing means 7 is reduced.

Figure 13A:
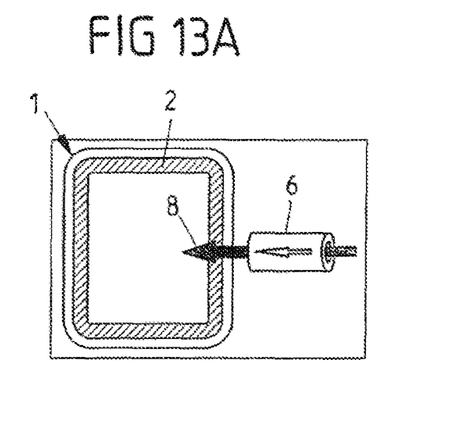
FIGS. 13A, 13B show a second modification of the second design variant of the method according to the invention.
Figure 13B:
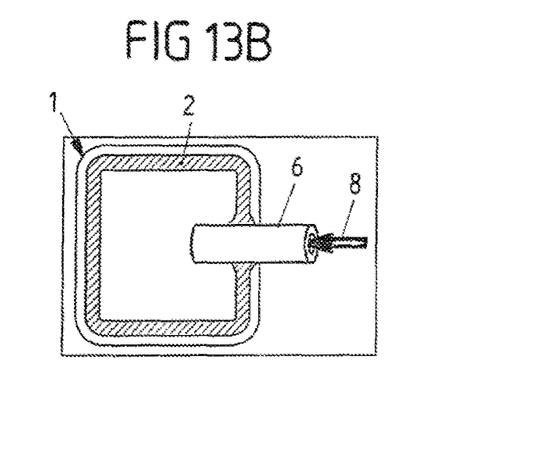

To be able to press a filling means 6, which frequently has a planar surface on its end face (e.g. when the filling means is realized by a hose), through a silicone track 2, one aspect of the invention provides the use of a spike for a pricking work, as is shown in FIGS. 13A, 13B. A corresponding spike 8 can be arranged on the end face of the filling means 6 to be introduced and facilitates piercing of the filling means 6 through the silicone track 2. After placing the filling means 6, the spike 7 can be removed again, for example through the hollow cylinder of a tubular filling means 6. In addition, such spike 8 can serve to provide a rather linear and defined entry of the filling means 6, whereby the predetermined breaking point obtained is defined more exactly and an improved quality of the arrangement is provided.

Figure 14:
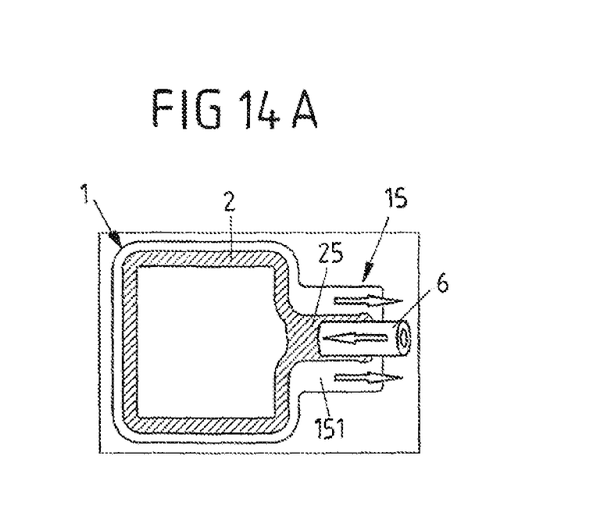
FIGS. 14A, 14B show a third modification of the second design variant of the method according to the invention.
Figure 14B:
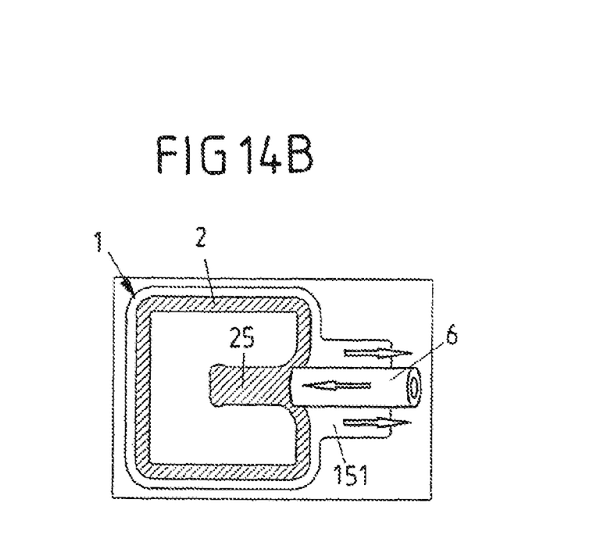
Figure 15A:
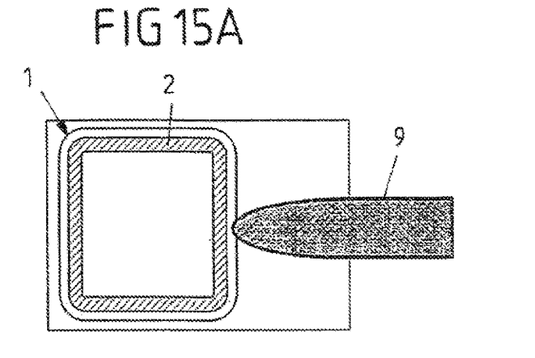
FIGS. 15A-15D show method steps of a third design variant of a method according to the invention for manufacturing a gas bag arrangement.
Figure 15B:
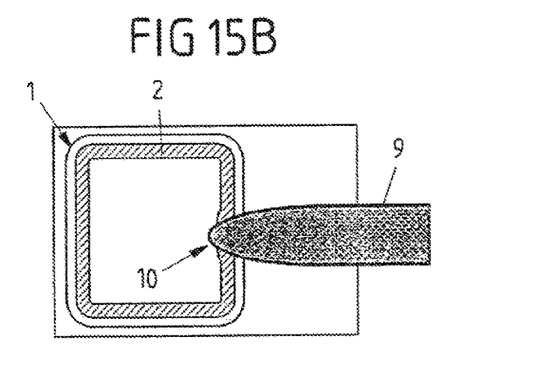
Figure 15C:
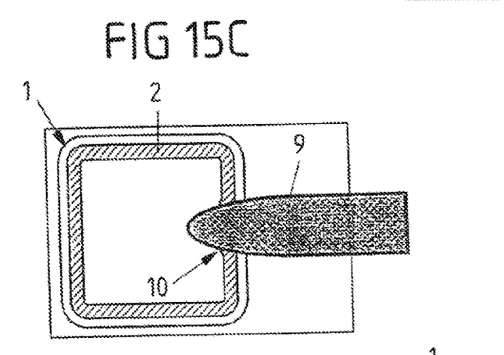
Figure 15D:
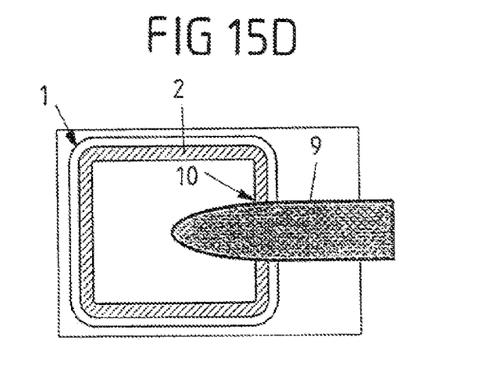

In turn, it applies that for a hose assembly the gas bag connecting channel must be clamped or held sufficiently firmly. In one exemplary embodiment it can be provided that the connecting region 15 receives broader edges 151, in which the gas bag can be retained for pushing in the filling means 6, as is shown in FIG. 14A. According to a further aspect (cf. FIG. 14B) it can be provided that the connecting region 15 is prolonged beyond the siliconized region, so that the protruding tabs 151 above and below the insertion opening can be utilized for holding up the insertion force.

FIGS. 15A to 15D show a modification of the method which in particular can preferably be used for filling means of larger diameter, in particular for filling means with a diameter of more than 8 mm. It is provided that initially an opening 10 is thrust into silicone track 2 by means of a tool 9, in order to provide a kind of receiving channel for the filling means, e.g. a gas generator. The tool 9 can be designed sword-like. After opening of the silicone seam 2, the tool 9 is pulled out again. Subsequently, the filling means is pushed into the silicone track 2 through the e.g. slot-like opening 10 obtained. The method then proceeds further as described with respect to FIGS. 10A to 10D.

During assembly e.g. of a gas generator in a gas bag, the gas generator can be clamped firmly and the gas bag can be pushed over the same. It also is possible to fix the gas bag mouth and push the gas generator into the gas bag by means of a pneumatic insertion aid. The rubber-like property of the siliconized allows to push in gas generators with sharp edges within the limits of occupational safety.

With reference to the schematic representations of FIGS. 16A and 16B, possible advantages of an elastic attachment of the filling means 6 by the elastic holding forces of the adhesive 20 in the form of silicone over an adhesive bond of the filling means 6 in the opening 5 of the gas bag 1 (likewise with silicone) without elastic holding forces will be explained below. Such adhesive bond for example can be established in that the filling means 6 is brought in contact with the adhesive 20 already before curing of the same.

Figure 16A:
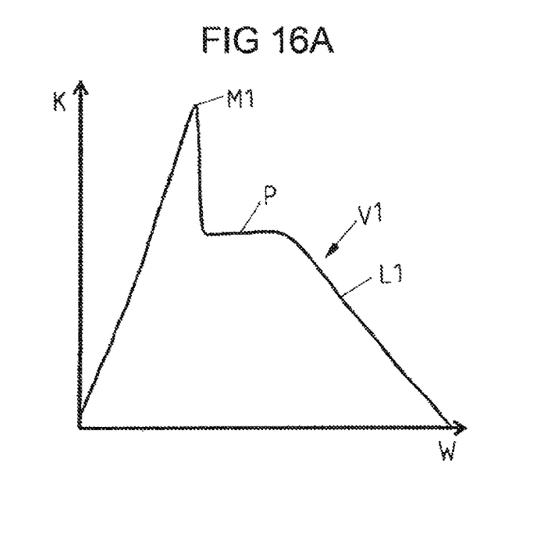
FIG. 16A shows a schematic representation of a force-path diagram of a tensile force measurement on a filling means elastically held in an opening of a gas bag.
Figure 16B:
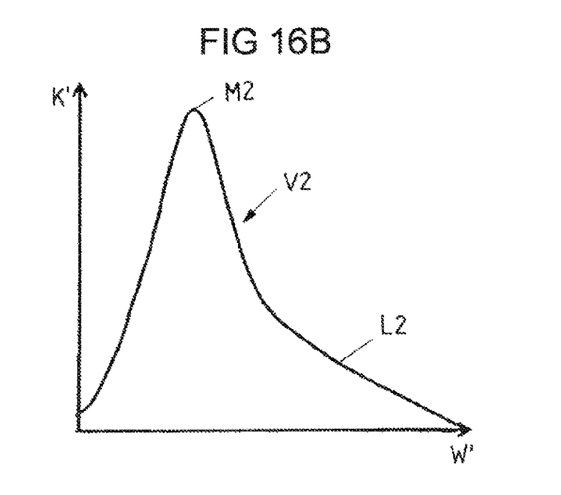
FIG. 16B shows a schematic representation of a force-path diagram of a tensile force measurement on a filling means glued into an opening of a gas bag.

Both FIGS. 16A and 16B each show a force-path diagram from tensile force measurements when pulling on the filling means 6 with the gas bag 1 retained in concrete application examples. The curves V1, V2 in FIGS. 16A and 16B each show the course of an applied (tensile) force K, K' against a covered distance W, W' of a pulling means.

The axes K, K', W, W' of the two schematically illustrated diagrams are scaled differently, so that the courses of the curves V1, V2, but not their absolute values can be compared with each other with reference to FIGS. 16A and 16B. The curve V1 as shown in FIG. 16A from the measurement of a concrete elastic attachment of the filling means 6 by elastic holding forces of the adhesive 20 reaches a maximum value M1 which—with an equal length (as seen in direction of the tensile force) of the adhesive 20—is higher than a maximum value M2 of the curve V2.

When the maximum value M1 is reached, the pulling means brings the filling means 6 into movement relative to the adhesive 20. In the present application example for FIG. 16A, the filling means 6 is non-positively held in the opening 5 of the gas bag 1 by the adhesive 20. A transition from a static friction to a sliding friction becomes noticeable by a decrease of the tensile force (here to about ⅔ of the maximum value M1). With a further pull on the filling means 6, the tensile force remains substantially constant, so that the curve V1 forms a plateau P. When the contact surface between filling means and adhesive starts to decrease, the tensile force continues to drop (substantially linearly) to zero in a portion L1. This corresponds to the point where the filling means 6 gets out of contact with the adhesive 20. Since the adhesive 20 exerts elastic holding forces on the filling means 6, it can gastightly seal the filling means 6 in the opening 5 even after a certain displacement thereof (e.g. by several mm). A tension relief of the filling means 6 also can yet be provided.

On the other hand, when the filling means 6 is glued without elastic holding forces (FIG. 16B), the tensile force K' quickly decreases due to a destruction of the adhesive bond upon reaching the maximum value M2, here to about ⅓ of the maximum force M2. Thereupon, the tensile force decreases substantially linearly in a portion L2. As compared to the curve K1, the curve K2 reaches a value of the tensile force K' of about zero already after a shorter path length W'. In contrast to a mere adhesive bond, a non-positively held filling means 6 therefore is held in the opening more securely.

Figure 17:
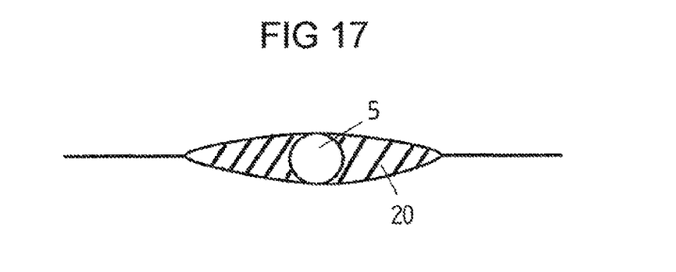
FIG. 17 shows an opening of a gas bag after withdrawing a filling means previously glued to the opening.

FIG. 17 shows an opening 5 of a gas bag 1 after withdrawing a filling means 6 (not shown) previously glued to the opening 5 by means of an adhesive 20. The opening 5 substantially corresponds to the diameter of the filling means 6 (in contrast to the attachment with elastic holding forces, as described already in connection with FIGS. 3A to 3D and 11A to 11D). For the adhesive bond, the adhesive 20 has been brought in contact with the filling means 6 already before curing. The adhesive therefore has merely attached around the filling means 6, without building up elastic holding forces. Due to a destruction of the adhesive bond, the adhesive 20 no longer gastightly seals against the filling means 6, even if the same still (at least in part) is present in the opening 5. Moreover, a destroyed adhesive connection cannot provide a tension relief. In the case of a destroyed adhesive connection, a pressurization of the gas bag 1 in addition can press the filling means 6 out of the opening of the gas bag 1.

An application example of the gas bag arrangement according to the invention and of the method according to the invention consists in that a hose for example of a diameter of 6 mm is guided through a dry silicone track for filling a small airbag with a volume of about Another application example provides that a gas generator is guided through a dry silicone track. After manufacturing the tight gas bag, e.g. a standard gas bag with a volume of 36 l, the dry silicone track according to FIGS. 15A-15D initially is pierced in the filling region of the gas bag and the gas generator subsequently is pushed in.

The invention is not limited in its configuration to the exemplary embodiments described above, which merely are to be understood by way of example. For example, the silicone tracks can be realized in a way and with a shape other than illustrated.

The invention claimed is:

1. A gas bag arrangement with a gas bag and a filling means arranged in an opening of the gas bag for filling the gas bag with gas, wherein
   the filling means is elastically held in the opening by a holding means arranged in the region of the opening, wherein the holding means has elastic properties due to which it exerts holding forces on the filling means;
   the holding means is an adhesive provided in the form of at least one closed adhesive track arranged between two or more gas bag layers of the gas bag; and
   when the filling means is pushed through the at least one closed adhesive track, the opening of the gas bag is formed.

2. The arrangement according to claim 1, wherein the filling means is formed substantially circular in cross-section and the holding means exerts elastic forces on the filling means in radial direction.

3. The arrangement according to claim 1, wherein the filling means is elastically held in an elastically deformable introduction channel which is formed by at least one adhesive track of the gas bag.

4. The arrangement according to claim 1, wherein the filling means is elastically held in a snout-like connecting region of the gas bag by the holding means.

5. The arrangement according to claim 1, wherein the filling means is a filling hose, a filling tube or a gas generator.

6. The arrangement according to claim 1, wherein holding means is silicone.

7. The arrangement according to claim 1, wherein the elastic holding forces, which the holding means exerts on the filling means, lead to a non-positive attachment of the filling means in the opening of the gas bag.

\* \* \* \* \*